Patented June 23, 1931

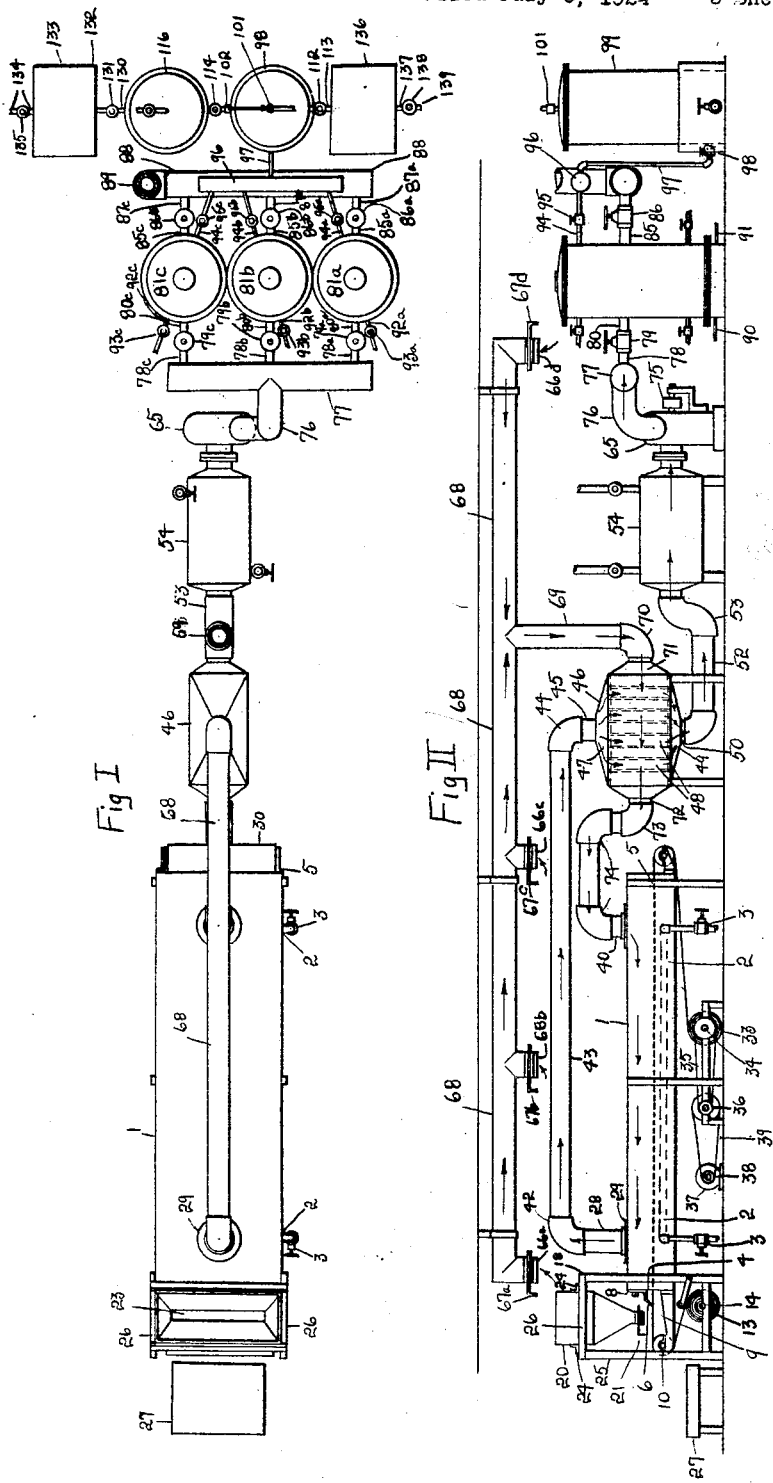

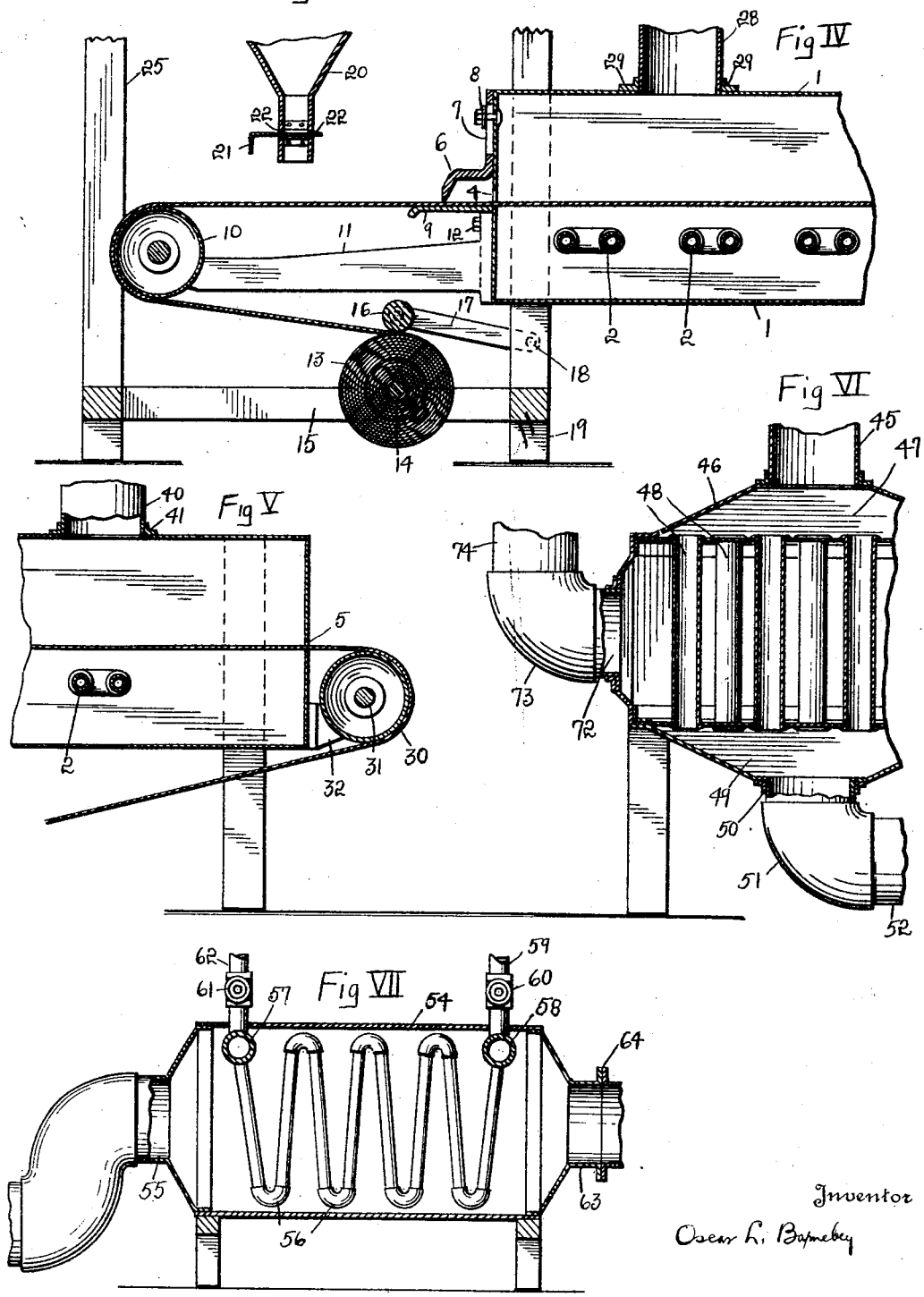

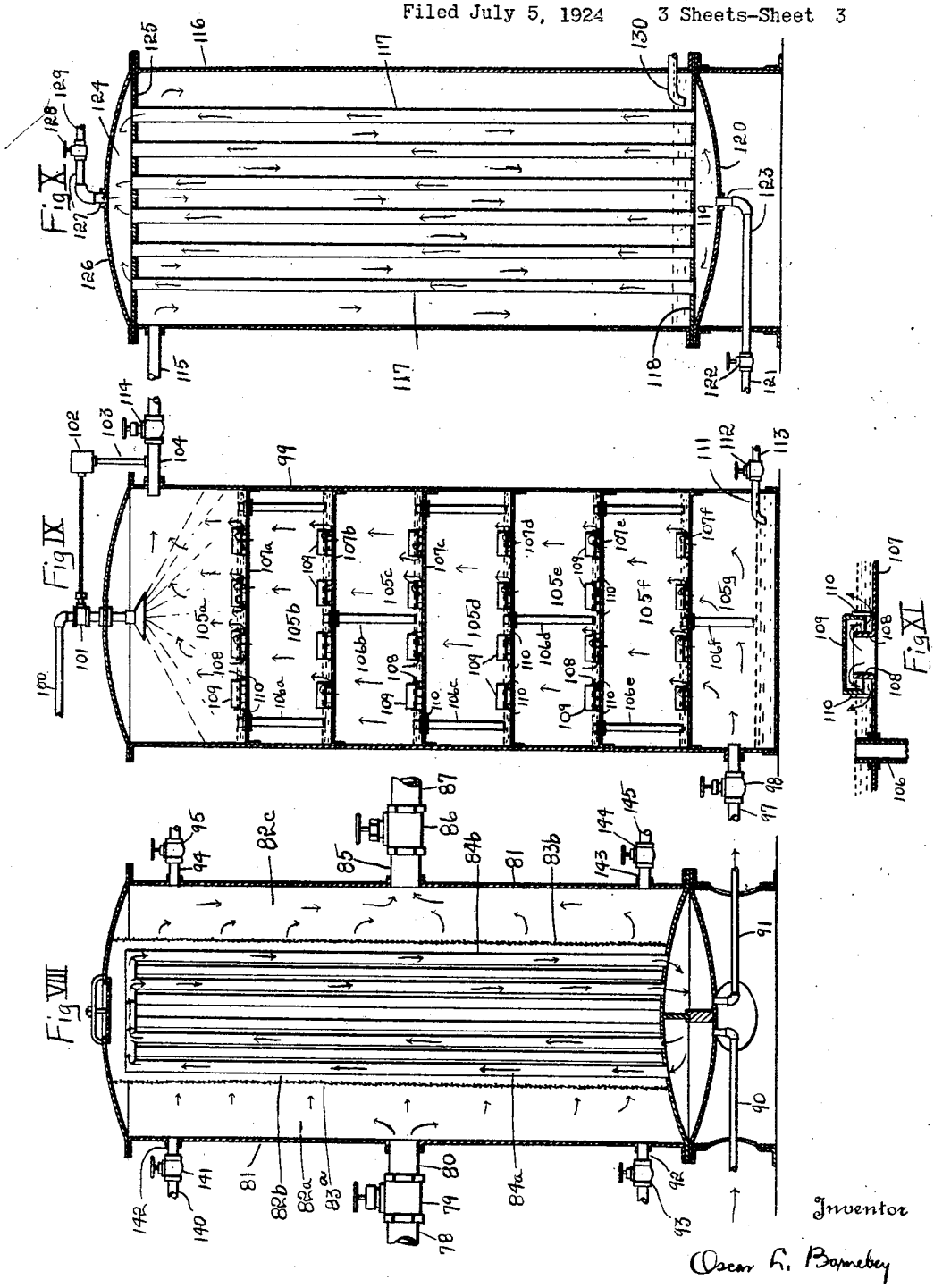

1,811,107

UNITED STATES PATENT OFFICE

OSCAR L. BARNEBEY, OF COLUMBUS, OHIO, ASSIGNOR TO AMERICAN SOLVENT RECOVERY CORPORATION, A CORPORATION OF OHIO

PROCESS OF RECOVERING SOLVENTS

Application filed July 5, 1924. Serial No. 724,418.

The invention relates to the recovery of volatilizable solvents in various manufacturing operations where articles or materials are being coated, bonded, or impregnated with mixtures which are rendered liquid, semi-liquid or soluble by vaporizable solvents. One of the chief instances of such manufacture is found in the production of coated and bonded fabrics, including the manufacture of artificial rubber, artificial leather, oil cloth, screening, sheet asbestos, and the like, and for the purposes of illustration I will describe my improved process as utilized in the production of such fabrics. In such manufacture the original fabric is cloth or material possessing a cloth-like structure which forms the frame work which is to be coated or bonded. On this frame work support or skeleton is spread, sprayed or coated a cementing material dissolved in suitable solvent. Ordinarily the textile is cotton, wool or mixture of cotton and wool, although the fabric may be other material such as metallic wire which can be used as the fundamental frame work or support.

The usual solvents employed are alcohol, ether, ethyl acetate, butyl acetate, amyl acetate, benzol, low boiling petroleum hydrocarbons such as butane, pentane, hexane and other similar hydro-carbons constituting such commercial products as gasoline, petroleum ether, naphtha, etc. These solvents are either used singly or mixed in various proportions. The particular solvent used is adjusted in proportionate ingredients to give the desired solubility toward the impregnating materials which are to be used for the coating and bonding operation in order to impart the desired properties to the fabrics being manufactured and also to give desired volatility in operation of the process. A typical solvent is as follows: 30 parts ethyl alcohol, 40 parts benzol, 10 parts butyl acetate and 20 parts gasoline.

Into this solvent is dissolved 20 to 60 ounces of nitro-cellulose per gallon of solvent. Ordinarily about 30 ounces is to be preferred, the amount varying with the thickness of the coat desired. For instance, when a black color is desired gas black may be added to the nitro-cellulose solution in the solvent and upon being mixed up thoroughly the gas black gives an excellent suspension which will color the final fabric black. If blue is desired finely pulverized ultra marine blue can be added to produce a permanent blue color of the finished article. All of such colors are added in a finely pulverized condition. All solid matter must be absolutely free from all grit. In certain cases soluble colors may be added to the nitro-cellulose dissolved in the solvent.

When a heavy coat is desired rubber can be dissolved in the solvent and various fillers added. In some cases the final admixture is fluid and will flow readily. In other cases, the mass is more or less plastic and may be quite stiff in consistency. Especially is this the case when fillers are added to the mixture. The more plastic masses require prolonged mixing to give a uniform coating material. In such cases considerable heat develops from the power mixers which must be used. With the development of heat in these mixers there is a tendency to volatilize solvent. I overcome such solvent loss by water cooling the mixers. With the thinner masses water cooling is not always absolutely necessary but is desirable in any case where the water is colder than room temperature. Working with a plastic mass I prefer to shape the mass into a strip of appropriate length and feed the strip to the rolls of the coating machines in front of a knife under which the fabric is being constantly drawn for coating. The knife is set rigidly in such a position as to allow only a definite thickness of layer of impregnating material to pass on to the cloth as it moves into and thru the machine. In the machine the solvent is evaporated. The thin layer of impregnating material which is spread evenly over the fabric by means of the knife produces a thin film on the fabric. Some of the material soaks into the fabric itself and produces in the first pass thru the machine a ground coat. If the impregnating mixture is quite liquid so that it will readily flow then the mixture is added thru a slot in front of the knife, such addition being made in a thin stream, regulated in accordance with the operation of the machine.

After adding the ground coat other coats of the same nature or of different composition are added in such number as necessary to build up the proper thickness of coat on the fabric. The number of coats may vary from one or two to as many as seven or even a dozen coats to fully develop the desired properties in the finished artificial fabric.

After passing the knife the fabric possessing the coat of impregnated material is caused to pass over steam coils or between steam coils for volatilizing the solvent and leaving the non-volatile cementing material behind on the fabric. A sufficient amount of additional heat is supplied to securely "set" or "bake" the coating to give a firm finished product possessing all the properties necessary for the particular application. In the meantime ordinary hot air is caused to pass over and around the fabric to aid in volatilization of the solvent. Such volatilization is made sufficiently slow not to blister the coat yet sufficiently fast to give rapid production from the coating machine.

Sometimes I prefer to heat the air previous to entering the coating machine and then again I prefer to heat both air and impregnated fabric with the same heating coils. While I add sufficient heat to volatilize the solvent and give the baking effect to properly "set" the coating, care is always taken not to overheat the fabric at any time as overheating is very undesirable. Heat is best applied as indirect steam in the ordinary case by means of steam coils or steam hot plates.

Since the solvents used are relatively expensive and since a large amount of solvent is required the proper working of the process requires the use of much more solvent than any other ingredient. My process is based upon the continuous use of the solvents wherein the solvent mixture is first used to dissolve the impregnating materials and carry fillers or pigments in suspension and after volatilization of the solvents to leave the solid material and non-volatile soluble materials on the fabric. The volatilized solvent is recovered in a special manner so that it can be used over again in the next solvent mixture.

My process then becomes one of continuous use of solvent wherein the solvent is utilized many, many times before it is mechanically dissipated or lost due to accidental leaks or small mechanical losses which inevitably occur in every practical operation.

My process further involves the recuperation of heat in a special manner whereby the heat of the solvent-air mixture as it leaves the machine is utilized to heat the incoming air as it enters the machine for volatilization of more solvent. The combination of the recovery of the solvent and utilization of the heat effects a very great saving as compared with previous processes which have been in use.

My process further utilizes a partial cooling for removing steam as one step of the recovery operation, this step giving a purer solvent and likewise avoiding a redistillation of solvent as it comes from the condenser used for condensing the solvent.

My process also involves provisions for minimizing the dangers of explosion which have heretofore attended processes of this character.

I will now describe my process in detail referring to the drawings in which

Figure I represents a horizontal view showing the ground plan of one form of my invention, Figure II shows the same form of invention in vertical cross section, Figure III is a detail of the lower part of hopper.

Figure IV is a detailed vertical cross sectional view of the intake end,

Figure V is a vertical cross sectional view of the exit end,

Figure VI is a vertical sectional view of recuperator,

Figure VII is a vertical cross sectional view of water cooler,

Figure VIII is a vertical cross sectional view of one adsorber,

Figure IX is a vertical cross sectional view of partial condenser,

Figure X is a vertical cross sectional view of condenser,

Figure XI is a fragmentary detail of a section of one of the separating plates of the partial condenser.

1 is a rectangular sheet iron housing of one of my coating machines which contains a series of coils 2 with entrance and exit control valves 3. The housing has an intake opening 4 and exit opening 5, thru which the fabric moves. Knife 6 is rigidly fastened to the housing in desired position by means of slots 7 and bolts 8. Apron 9 is a rigid projection from the housing at intake end and forms a platform to support and evenly distribute the fabric as it passes beneath the knife and enters the housing.

Roller 10 directs and positions the fabric previous to passing into the coating machine. The roller is held in position by arms 11 which are fastened to the housing by bolts 12. The bolt of cloth 13 on roller 14 revolves in position in cross piece 15 and cloth is held taut by idlers 16 on arm 17 and pivots 18 of frame support 19.

The hopper 20 holds the impregnating mixture of solvent, nitro-cellulose, pigment, etc. and a damper 21 sliding thru slot 22 allows more or less of the liquid mass to pass thru the rectangular slot which is contained in the damper and which corresponds to opening 23 of the hopper. The hopper is supported by means of angles 24 and uprights 18 and 25 as well as cross pieces 26. The operator stands on platform 27.

A vapor air duct 28 is fastened to the machines at 29 near the intake end of the machine. At the exit end roller 30 rolls on shaft 31 which is supported by castings 32 which are fastened to the end of machine housing. The fabric passes over the roller and back under the machine to roller 33 which is positioned in spool 34 which is belt driven by belt 35 which in turn is attached to jack shaft 36. This shaft reduces the speed of revolution to the desired degree as the power is communicated from the motor 37 by means of pulley 38 and belt 39. Intake air duct 40 is attached to the housing at 41 near the exit of the coated or bonded fabric. The exit air-solvent vapor mixture passes thru 28 to elbow 42 then thru duct 43, elbow 44 and pipe 45 to the recuperator 46 which possesses distributing head 47 which distributes the hot gases into pipes 48. The lower ends of pipes 48 are attached to collector 49. The collector 49 connects by means of exit nipple 50 to elbow 51 thru which the partially cooled gas-solvent mixture passes to conduit 52 and thence thru connection 53 to water cooler 54. The air-solvent mixture enters the water cooler at 55 and passes cooling pipes 56 which are arranged in multiple series by manifolds 57 and 58, the cold water entering thru pipe 59 and valve 60 and the warm water exiting thru valve 61 and pipe 62.

The cooled air exits from the cooler at 63 which is flanged at 64 to entrance of blower 65. Air from the room enters the ports 66a, 66b, 66c, and 66d. The amount of air entering at any port is regulated by the corresponding gate valves 67a, 67b, 67c and 67d. The air passes thru duct 68 to passage 69, thence thru elbow 70 into chamber 71, into contact with heated pipes 48 and exits as hot air at 72, passing thru elbow 73 in pipe system 74, then thru 40, into the coating machine 1.

Blower 65 receives cooled air-solvent mixture from cooler 54 and by means of pulley 75 driven by a belt drive which is not indicated in the drawings the blower discharges the mixture under positive pressure into duct 76 which terminates in a manifold 77 from which lead the pipe connections 78a, 78b and 78c with valve controls 79a, 79b, and 79c in each. Pipe lines 80a, 80b and 80c connect to the adsorbers 81a, 81b and 81c.

The adsorbers are circular vessels, ordinarily constructed of a heavy metal such as sheet iron or steel plate. The interior of the vessels is divided into three zones, 82a, 82b and 82c. 82a is the distributing zone for spreading the gases out uniformly throughout the length of the adsorbers as they enter through 80a, 80b or 80c.

The distributed air-solvent mixture then passes thru screen 83a and thru zone 82b which is filled with granular adsorbent carbon surrounding the heating and cooling pipes 84a and 84b. In zone 82b the solvent is removed from the air by the adsorbent carbon and the air depleted of its solvent passes out thru screen 83b, through collecting zone 82c and from thence the air exits thru pipes 85a, 85b and 85c, the exits being controlled by valves 86a, 86b and 86c to manifold 88 to uprising pipe 89 from which the air is vented thru the roof of the building or is returned to the room for recirculation.

Water or steam enters thru pipe 90 and warm water or condensate from the steam exits thru pipe 91, the individual connections to said pipes being separately controlled by appropriate valves and traps not shown on the drawings. The water or steam rises thru pipes 84a and passes down thru pipes 84b, thus securing excellent application of heat when steam is used and excellent cooling when cold water is added to the pipe system embedded in the adsorbent carbon.

Steam is added directly to zone 82 thru pipes 92 and valves 93. Distillate containing steam and solvent exits thru pipes 94 and valves 95, connecting by means of manifold 96, pipe 97, and valve 98 to partial condenser 99.

The partial condenser 99 is cylindrical in shape. Into the top portion of the partial condenser is sprayed water, the water entering thru pipe 100 and automatically controlled valve 101. The automatic valve is functioned by the action of thermo member 102, projecting by means of pipe 103 into the partial condenser exit pipe 104. The water entering thru the automatically controlled valve 101 is injected in the desired amount into the top zone 105a of the partial condenser. As soon as the water attains the top level of drain pipe 106a the water overflows into the zone 105b. Zones 105a and 105b are separated from each other by plate 107a. Into plate 107a and also the other separating plates 107b, 107c, 107d, 107e and 107f are welded short pipes 108 with inverted caps 109 which have supporting projections 110, said projections holding the caps a definite distance above the plates 107 yet not sufficiently high to lift the caps above the water level on the plates. The height of the projections is regulated to give the correct emersion of cap in the water layers. Thus each pipe 108 and cap 109 forms a water trap through which the distillate must pass in transit thru the partial condenser in accordance with the direction of arrows within the partial condenser.

The water overflows from zone 105a, passes thru pipe 106a to zone 105b above plate 107b. From zone 105b the water passes thru overflow pipe 106b to zone 105c, etc., passing on thru zone 105d, 105e, 105f and to the bottom zone 105g, from which the trap 111 removes the water from the partial condenser upon opening valve 112.

Pipe 113 conducts the water to any desired place. The water in passing down thru the partial condenser as described above cools the steam-solvent vapor, condensing out substantially all the water vapor or steam and when desired also some of the higher boiling point compounds in the solvent mixture. Ordinarily only the water vapor is condensed. However, the partial condenser can be regulated to remove any portion of the vapor which comes to the partial condenser. The non-condensed vapor then passes out thru pipe 104, valve control 114 and pipe 115 to condenser 116. Condenser 116 cools the vapor and condenses the same to liquid by means of cooling pipes 117 which terminate at the bottom in plate 118 which forms a header 119 by being flange connected to base plate 120.

Cold water enters thru pipe 121, valve control 122 and pipe system 123. The water distributes in header 119 and passes up thru the tubes 117. Warm water passes out thru tubes 117 at the top into header 124 formed by tube sheet 125 and top 126 being flange connected. The pipe system 127, valve 128, and pipe line 129 remove the warm water to any desired place. The condensate from the condenser is removed by trap 130, valve 131 and pipe 132 to receiver 133. The receiver holds the solvent in storage until it is needed for the next batch of solvent, nitro-cellulose pigment mixture. When the solvent is needed it is withdrawn from the receiver by means of pipe 134 and valve 135.

The condensate with excess of water from the partial condenser passes thru valve 112 and pipe line 113 to receiver 136 where it is held in storage if desired until a sufficient quantity has accumulated after which it is removed thru pipe line 137, valve 138 and exit pipe 139, and either sent to waste if it contains no solvent of any valve or else delivered to a still or distilling column in which any volatile materials are distilled out or the solution of solvent in the water is treated with salts to salt out the solvent in an insoluble form and separate it in that manner. In fact, any conventional manner of separation of the solvent from water can be utilized without departing from the spirit of this invention.

Adsorbers 81 are equipped with intake pipe 140, control valve 141 and connection 142, thru which cold air can be blown to cool the adsorber and contents, the cold air passing through the adsorber and exiting thru pipe 85, valve 86 and pipe connection 87. Connection 143 thru control valve 144 and exit pipe 145 is used to remove any condensate from the adsorbers at any time. 145 is ordinarily connected to a trap not shown in the drawings.

Referring to the above description and to the drawings the process is practiced as follows:

The solvent containing dissolved solids such as nitro-cellulose and suspended pigment is first thoroughly mixed in water jacketed mixers and when of the proper physical consistency is dumped into hopper 20. A bolt of fabric is placed on spool 14 and the exterior end wound over rollers 10 and 30 and onto spool 34. The motor 37 is started. A belt system turns spool 34 which draws the fabric through the coating machine 1. The operator of the machine opens the slide 21 to the proper degree allowing a film of solvent mixture to flow onto the cloth. Knife 8 scrapes back the excess of solvent mixture and only allows a very uniform layer of the mixture to go onto the cloth. Meantime the steam is turned onto the coils by opening valves 3. Blower 65 is started and slides 67a, 67b, 67c and 67d opened. By the suction of the blower air is pulled from the room thru openings 66a, 66b, 66c, and 66 d, drawn thru the recuperator 46 in which the air becomes preheated and from thence into the exit end of the coating machine. The warm air traverses the length of the coating machine. The hot air containing the volatilized solvent is pulled by suction thru pipes 28, 43 and 45 thru the recuperator, the movement being perpendicular to the movement of intake air through the recuperator. The partially cooled air from the recuperator is fully cooled in water cooler 54.

The cooled air passes thru the blower 65 and is blown into the manifold 77. From this manifold by regulation of the valves 79a, 79b, and 79c the air-solvent mixture is passed thru one of a series of adsorbers, designated in the drawings at 81a, 81b, and 81c. The adsorbent carbon removes the solvent from the air and the air stripped of its solvent passes out through the exit valves 86, manifold 88 and pipe system 89.

When the first adsorber is saturated with solvent the valves corresponding to the first adsorber are closed and the valves opened to saturate the second adsorber, meantime the operation of coating the fabric continues without interruption. While the second adsorber is being saturated the first adsorber is being distilled by adding steam to the steam coil system embedded in the adsorbent carbon and also with the addition of steam directly to the adsorber. The steam distillate containing water vapor and volatilized solvent passes out thru pipes 94 and valves 95, thence thru manifold 96 and pipe connection 97 to the partial condenser 98.

The automatic valve 101 is set by means of mechanism 102 so that the control of amount of water entering is based on the temperature of vapor exiting thru pipes 104. If the temperature of vapor rises too high in 104 so that vapor of too high a boiling point is passing from the partial condenser the valve 101 automatically opens and allows more water to enter, thus cooling the vapor and lowering the temperature of vapor passing thru 104. When the vapor has cooled to proper degree more water is allowed to enter by action of the automatic thermo regulator. The thermo member can be adjusted to obtain any desired separation of compounds of different boiling points, such as steam from solvent, or high boiling point compounds from compounds of low boiling points.

In the partial condenser the steam is condensed and the pure solvent vapor passes into condenser 116 in which it is fully condensed and allowed to pass into receiver 133. If at the end of the distillation period for the first adsorber the second adsorber is saturated with solvent then the air-solvent mixture from the coating machine is turned into the third adsorber by appropriate changing of valves and the second adsorber and steam distilled as described for the first adsorber. Meantime cold air is blown thru the first adsorber and the air either sent to waste through manifold 88 and pipe system 89 or else by-passed to third adsorber should there be a significant amount of vapor worth recovering as the air is first passed thru the first adsorber. Ordinarily this air is sent to waste since it usually does not contain sufficient solvent to justify further treatment. When the first adsorber is sufficiently cooled the air is shut off and the first adsorber is then ready to take up more solvent from more air as in the first case. When distillation is complete with the second adsorber it is cooled with air like the first adsorber. When adsorber number three is saturated with solvent the air is then turned into the first adsorber, etc., using the adsorbing towers over and over again in continuous cycle and partially condensing the water vapor and fully condensing the solvent, receiving the water condensate from the partial condenser in one receiver and receiving the solvent condensate into another receiver. Should the water condensate from the partial condenser contain valuable solvent it is treated in the appropriate manner to remove such solvents whether it be by redistillation, salting out the solvent from the water, or a combination of salting out and redistillation. When the recovery is made from the condensate from the partial condenser the recovered solvent is added to the solvent from the last condenser, the latter solvent being first separated, of course, from any water remaining mixed therewith.

The recovered solvent is used with the next batch of solvent mixture with a new amount of nitro-cellulose or other soluble ingredients, pigment, etc., to further operate the process which involves using the solvent over and over again.

In my process the only solvent added to the operation is that gradually lost by diffusion from the room or other natural loss which cannot be prevented by recovery such as the small amount of solvent which is retained in the coated or bonded fabric.

A large number of changes can be made in mechanically achieving the objects of my process, such details being of secondary importance. The main steps of the process consist in first producing a solvent containing soluble ingredients to be deposited or impregnated into a fabric or bonded with the same containing pigments to give color to the finished article and containing filler to give body to the impregnated materials, then spreading or otherwise uniformly depositing the solvent mixture on a fabric or skeleton adapted to receive the solvent mixture. The solvent is then vaporized from the fabric in such a manner as to recover a substantial portion of the heat used in the coating machine and returning the heat for further vaporization of the solvent within the machine. The process includes the additional step of cooling the air-solvent mixture to substantially room temperature and forcing the cooled air through adsorbers containing adsorbent carbon. The adsorbent carbon removes the solvent from the air. The adsorbed gases and vapors are then distilled from the adsorbent carbon by use of either or both direct and indirect steam. The next step separates the steam from the solvent by means of a partial condenser and at the same time separating any high boiling point fractions of the solvent mixture when desired. This is followed by the step of condensing the last portion of volatile solvent in an appropriate condenser. The solvent condensed or separated is then used again in succeeding batches of bonding or coating mixtures, thus securing a continuous use and re-use of solvent in the manufacture of coated or bonded fabrics.

In the foregoing description and in the claims the use of the work "fabric" is to be interpreted to include all materials which will give a matrix or structure capable of supporting the coating or bonding material or capable of producing a layer of material after being thoroughly mixed and spread out in the form of a sheet, resulting in a solid material after the evaporation of the solvent. In this sense the word "fabric" will include not only cotton, wool or mixtures of the same in the form of cloth, but it will also include any materials which can be mixed together or woven together, for instance like wire cloth, asbestos cloth and the like.

The invention still further includes the production of a fabric following the principles herein outlined in which the solvent mixture containing the soluble ingredients is mixed thoroughly or mascerated with fibres of any material like cotton, wool or asbestos, along with such fillers as might be desired, such as clay, fuller's earth, powdered asbestos, magnesia and the like, said mixture then being spread in a uniform layer and treated as herein described to produce a cloth fabric or blanket of material utilizing applicant's process or evaporating the solvent in the presence of air, recovering the solvent by adsorption in adsorbent carbon in the manner herein described, recuperating the heat as specifically described and using the solvent over and over again in a continuous manner.

In the above description I have described the use of nitro-cellulose. The nitro-cellulose is usually the tetra-nitro-cellulose, sometimes called "pyroxylin", although commercial nitro-cellulose is not necessarily pure tetra-nitro-cellulose. For certain purposes other solvent soluble materials can also be used. For instance, sometimes I use cellulose acetate. Again to accomplish other purposes I use soluble rubber. My invention is not limited to any one soluble substance but is applicable to the use of many soluble materials of this general character.

For filler, when such is used, I use calcium carbonate, magnesia, kieselguhr, zinc oxide, clay or other siliceous material, powdered asbestos, and other like materials, depending upon the specific properties I wish to produce. Frequently these fillers are used in the powdered form. However, when a fibrous product is to be produced the original fibres of the filler which are to produce the matrix or fabric are used as such and are not pulverized or powdered. Sometimes, care is used to select long fibre varieties of materials in order to obtain the best matrix possible for my products. In some cases I use no filler whatever except the coloring materials which may be added in the form of solid materials.

Sometimes I wish to coat materials such as iron, wood and the like. In such cases I dip the materials to be treated into my solvent mixtures or spray the goods with the solvent mixtures, then volatilize the solvent in the presence of an excess of air and treat the air-solvent mixture as heretofore described to obtain a continuous use and re-use of solvent and recuperation of heat from the hot gaseous vapors.

One of the valuable features of my process is that I can operate with a large excess of air. I prefer that the air be in excess of the amount necessary to effect the evaporation of the solvent and, in fact, I prefer to operate in such a manner as will give a solvent-air mixture sufficiently low in concentration of solvent as to be safely below the range of any possible explosive concentration of solvent in air. Usually this can be attained below two or three per cent of solvent in air. In other cases lower concentrations are used. One half to one per cent concentrations are very favorable indeed for many solvents, such concentrations being sufficiently beneath the explosive range to give very excellent results.

With my process using adsorbent carbon I can work with very low concentrations of gases and solvent vapors and obtain high yields of such from air. I have further discovered that such concentrations will not explode in the presence of adsorbent carbon. The adsorbent carbon has the property of taking up the solvents and allowing the air to pass through without reacting with the adsorbent carbon. By evaporating the solvent with an excess of heated air and then cooling the air in the manner illustrated and described followed by separation of solvent from air with adsorbent carbon and distillation of the solvent in the manner described, a very efficient operation can be conducted. Whenever air is used to evaporate the solvent or assist in the evaporation of the solvent the air is used in a sufficient amount to always yield a non-explosive solvent-air mixture. In this connection it is to be noted that in the distillation of the solvent from the solid adsorbent, the steam when introduced into the adsorber displaces the air present before the temperature of the carbon is raised sufficiently to distill off solvent, so that the formation of an explosive mixture is obviated.

Using an excess of air for solvent evaporation, I am able to use a lower temperature than is required with limited amounts of air. The lower temperature minimizes any tendency of air to react with the volatilized solvent and non-volatilized portion on the materials. Further the sweeping effect of the excess of air rapidly moves the solvent away from the immediate vicinity of the evaporative surfaces allowing more solvent to rapidly evaporate. This mechanical sweeping effect allows a much increased production to be obtained with any given size machine or manufacturing unit following my process. In using the excess of air the dilution of solvent in the air-solvent mixture is sufficiently low to insure the maximum efficiency of solvent removal from the finished manufactured articles and to give essentially odorless solvent-free products producing a superior quality of goods, in fact a much improved quality over goods made using processes involving high concentrations of solvent.

I have further found that I can use a much higher concentration of solvent by substituting a gas like nitrogen, carbon dioxide or flue gases resulting from the combustion of ordinary fuels and using these gases in the same manner as described heretofore for the use of air. With such gases I use an excess of the inert gas to accomplish my purposes. A further advantage secured by the use of such inert gases is the reduction of oxidizing effect upon the non-vaporizable part of the material coating mixture (as where the latter includes a drying oil) and in some cases also upon the solvent employed. Furthermore, the use of the inert gas in lieu of air has particular merit wherever the solvent mixture contains a constituent which is of such a character as to be catalytically oxidized by the absorbent carbon in the presence of air.

In my invention air is considered inert when below the reaction range of air and solvent mixture being used. For the higher concentrations, for instance three to ten per cent and more of solvent concentration by volume, such mixtures are more or less subject to explosion in the presence of air and consequently when using these higher concentrations I substitute such gases as nitrogen, carbon dioxide or products of combustion as described above. I have found that these gases can be used in excess to evaporate solvent. Such solvent mixture can be cooled and passed through adsorbent carbon in accordance with the process herein outlined without danger of explosion. When I use such gases as nitrogen, carbon dioxide or products of combustion I do not waste the same after each use but use the gases over and over again by connecting the gas exit from the adsorbers to the gas intake to the recuperators which allows me to obtain a continuous cycling of inert gas without unduly wasting the same.

Since the invention is broad in its scope and not limited to the details described above it is understood that the limitations of the invention are only those defined in the following claims:

I claim:

1. The process of recovering volatile solvents comprising vaporizing the solvent with air in excess of the amount adapted to produce an explosive mixture with the solvent; contacting the air and solvent mixture with a solid adsorbent to adsorb the solvent and thereby separate it from the air; and distilling the solvent from the adsorbent by direct application of steam.

2. The process of recovering volatile solvents comprising vaporizing the solvent with air in excess of the amount adapted to produce an explosive mixture with the solvent; contacting the air and solvent mixture with adsorbent carbon to adsorb the solvent and thereby separate it from the air, meanwhile maintaining said mixture and carbon at temperatures sufficiently low to prevent reaction between the air, solvent and carbon; and applying steam directly to the adsorbent carbon to distill the solvent therefrom.

3. The process of recovering volatilized solvents from gaseous mixtures comprising cooling the mixture; passing said mixture into adsorbent carbon to adsorb the solvent; distilling the solvent from the adsorbent carbon by the direct application of steam; partially condensing the steam and solvent distillate to separate substantially all the steam therefrom; and thereafter condensing the remaining distillate.

4. The process of recovering volatilized solvents from gaseous mixtures comprising cooling the mixture; passing said mixture into adsorbent carbon to adsorb the solvent; distilling the solvent from the adsorbent carbon by the direct application of steam; partially condensing the steam and solvent distillate to separate therefrom substantially all the steam and a portion of the solvent mixture; separating into its constituents the condensate resulting from said partial condensation; and condensing the remaining portion of the distillate.

5. The process of recovering volatilized solvents from gaseous mixtures comprising cooling the mixture; passing said mixture into adsorbent carbon to adsorb the solvent; distilling the solvent from the adsorbent carbon by the direct application of steam; partially condensing the steam and solvent distillate to separate therefrom substantially all the steam and a portion of the solvent mixture; separating into its constituents the condensate resulting from said partial condensation; condensing the remaining portion of the distillate; and separating the constituents of the last resulting condensate.

6. The process of recovering volatilized solvents from gaseous mixtures comprising cooling the mixture; passing said mixture into adsorbent carbon to adsorb the solvent; distilling the solvent from the adsorbent carbon by the direct application of steam; partially condensing the steam and solvent distillate to separate therefrom substantially all the steam and a portion of the solvent mixture; separating into its constituents the condenate resulting from said partial condensation; and dehydrating the last resulting condensate.

7. The process of recovering volatilized solvents from gaseous mixtures comprising cooling the mixture; passing said mixture into adsorbent carbon to adsorb the solvent; distilling the solvent from the adsorbent carbon by the direct application of steam; partially condensing the steam and solvent distillate to separate therefrom substantially all of the steam and a portion of the solvent mixture; separating the water from the resulting condensate; and condensing the remaining portion of the distillate.

8. The process of recovering volatilized solvents from gaseous mixtures comprising cooling the mixture; passing said mixture into adsorbent carbon to adsorb the solvent; distilling the solvent from the adsorbent carbon by the direct application of steam; partially condensing the steam and solvent distillate to separate therefrom substantially all of the steam and a portion of the solvent mixture; separating the solvent constituents from the condensate; condensing the remaining portion of the distillate; and separating the solvent constituents of the last resulting condensate from the water thereof.

9. The process of recovering volatilized solvents from gaseous mixtures comprising cooling the mixture; passing said mixture into adsorbent carbon to adsorb the solvent; distilling the solvent from the adsorbent carbon by the direct application of steam; partially condensing the steam and solvent distillate to separate therefrom substantially all of the steam and a portion of the solvent constituents from the condensate; condensing the remaining portion of the distillate; separating the solvent constituents of the last resulting condensate from the water thereof; and combining the solvent constituents thus separated from the two condensates.

10. The process of recovering volatile solvents comprising evaporating the solvent with heated air; transferring heat from the resulting air and solvent mixture to the air used to volatilize the solvent; thereafter passing the air and solvent mixture into adsorbent carbon to adsorb the solvent; and distilling the solvent from the adsorbent carbon.

11. The process of recovering volatile solvents comprising evaporating the solvent with heated air; transferring heat from the resulting air and solvent mixture to the air used to volatilize the solvent; effecting further cooling of the air and solvent mixture; passing the cooled mixture into adsorbent carbon to adsorb the solvent; and distilling the solvent from the adsorbent carbon.

In testimony whereof, I hereunto affix my signature.

OSCAR L. BARNEBEY.

CERTIFICATE OF CORRECTION.

Patent No. 1,811,107.   Granted June 23, 1931, to

OSCAR L. BARNEBEY.

It is hereby certified that error appears in the printed specification of the above numbered patent requiring correction as follows: Page 6, line 114, for "use" read have; line 115, for "required" read feasible; line 116, after "air" and before the period insert because the large volume of air has a marked cooling effect on the adsorbent carbon when the vapor and air mixture is passed into it. Thus the heat of adsorption is counteracted, the carbon is maintained at a lower temperature and its adsorption capacity correspondingly increased.; line 118, for "on" read of; line 119, insert a comma after Further; and that the said Letters Patent should be read with these corrections therein that the same may conform to the record of the case in the Patent Office.

Signed and sealed this 3rd day of November, A. D. 1931.

(Seal)

M. J. Moore,
Acting Commissioner of Patents.